United States Patent [19]

Uram

[11] Patent Number: 5,798,066
[45] Date of Patent: Aug. 25, 1998

[54] METHOD OF FORMING HOLLOW CERAMIC ARTICLES

[75] Inventor: Stuart Z. Uram, Alpine, N.J.

[73] Assignee: Certech Incorporated, Wood-Ridge, N.J.

[21] Appl. No.: 501,474

[22] Filed: Jul. 12, 1995

[51] Int. Cl.$^6$ ...................................................... B29C 45/03
[52] U.S. Cl. ............................................. 264/85; 264/572
[58] Field of Search .............................. 264/63, 85, 572

[56] References Cited

U.S. PATENT DOCUMENTS

| | | | |
|---|---|---|---|
| 4,530,808 | 7/1985 | Renlund et al. | 264/63 |
| 4,944,910 | 7/1990 | Hendry | 264/572 |
| 5,126,082 | 6/1992 | Frank | 264/28 |
| 5,151,278 | 9/1992 | Baxi et al. | 425/130 |
| 5,198,177 | 3/1993 | Sugiyama et al. | 264/572 |
| 5,240,399 | 8/1993 | Baxi et al. | 425/190 |
| 5,252,287 | 10/1993 | Fries | 264/572 |
| 5,262,105 | 11/1993 | Komiyama et al. | 264/85 |
| 5,266,020 | 11/1993 | Peterson | 425/130 |
| 5,277,866 | 1/1994 | Wright | 264/572 |

OTHER PUBLICATIONS

W.D. Kingery et al., Introduction to Ceramics, pp. 6–7, 1976.

*Primary Examiner*—Laura Edwards
*Assistant Examiner*—Michael P. Colaianni
*Attorney, Agent, or Firm*—Amster, Rothstein & Ebenstein

[57] ABSTRACT

A method of forming a hollow ceramic article includes the steps of providing a mold having a wall defining a cavity and injecting into the cavity through an inlet through the cavity wall a quantity of a slurry sufficient to fill the cavity. The slurry is formed by a molten thermoplastic binder and ceramic particles suspended in the binder. The portion of the slurry in contact with the cavity wall is cooled to solidify the same, while leaving still molten the portion of the slurry not in contact with the cavity wall. Gas is injected into the cavity through an inlet through the cavity wall and into the still molten slurry portion to force the same out of the cavity through an outlet through the cavity wall. This leaves therein only the gas and a hollow green piece formed from the solidified slurry portion. The hollow green piece is separated from the mold, and the separated hollow green piece is fixed to remove substantially all of the binder therefrom and sinter together substantially only the ceramic particles therefrom.

10 Claims, 2 Drawing Sheets

F I G. 1
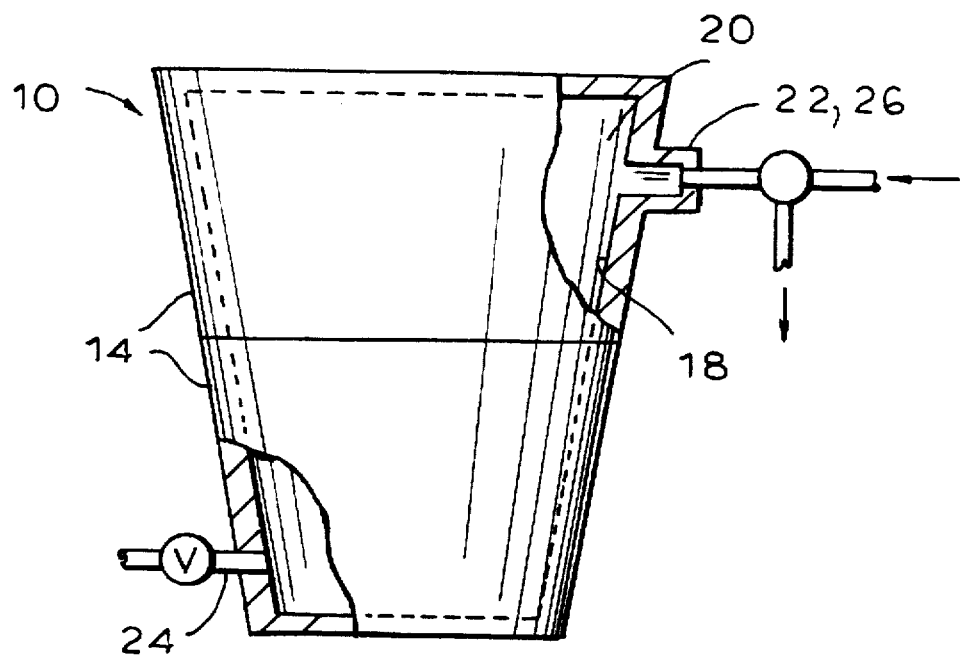
F I G. 2
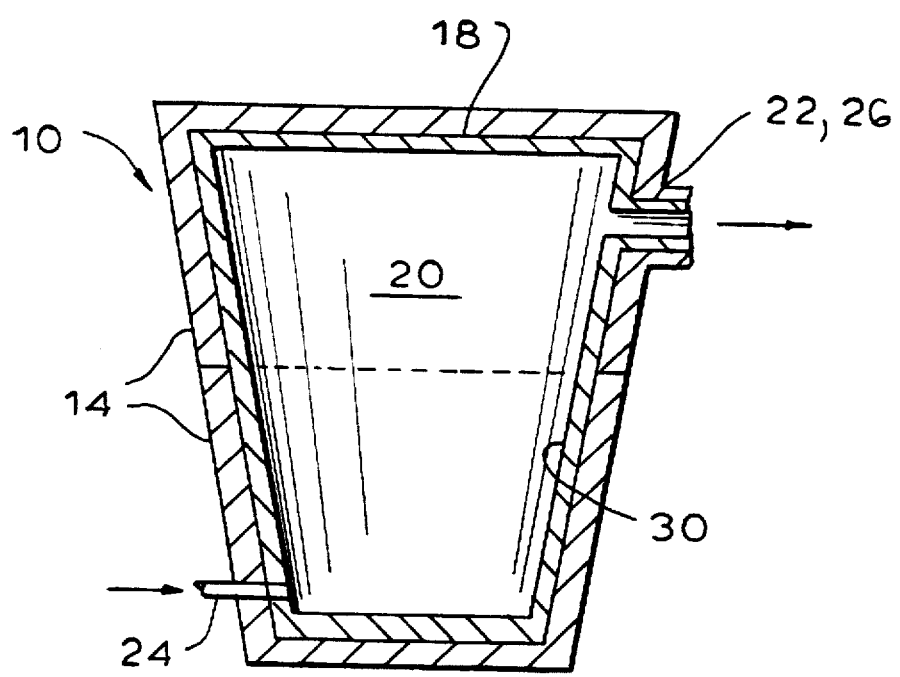

5,798,066

METHOD OF FORMING HOLLOW CERAMIC ARTICLES

BACKGROUND OF THE INVENTION

The present invention relates to a method of forming a hollow ceramic article, and particularly to a method of forming a hollow ceramic core of the type useful in investment casting.

It is highly desirable to manufacture ceramic cores and other ceramic articles that are hollow. When articles of large cross section—those having a cross section above 1/8" and especially those having a cross section of 1/2" and above—a multitude of problems arise which could be solved by making the ceramic article hollow.

First, in injection molding the dwell time for holding the piece within the mold is extended by the square or cube of the cross-sectional dimension because the setting of the piece requires heat transfer across the cross-section. Thus, if the core or article is hollow, the cross-sectional dimension and thus the time required for heat transfer is greatly reduced. Second, in articles of large cross-section, cavitation results from the shrinkage of the mass of the material. Cavitation occurs as the binder solidifies since there is a large volume change from liquid to solid. Also, distortion of the piece (e.g., sink marks) may occur in the case of a complex part, such as a large airfoil core, after the part is removed from the die since the thin sections of the piece cool faster than the thick sections thereof which remain warm longer because of the poor heat transfer from the center of the section. Third, in firing of the ceramic article, the difficulty in removing the binder is related to the cross-sectional area, and thus the time required to extract the binder material without rupturing the surface of the article is greatly extended for articles of large cross-section. Fourth, during the casting operation, the heavier the core the more difficult it is to form a ceramic shell mold about the core because the weight of the wax pattern containing the core will be very heavy. Fifth, once a casting has been manufactured, the greater the cross section of the core, the more difficult it is to remove the core from the casting. For each of the reasons discussed above, hollow ceramic articles (e.g., hollow ceramic cores) are desirable.

Hollow cores, typically used for casting, have been made before in one of three ways. First, the hollow core was made in multiple pieces which were then secured together to form a hollow shape. Such cores exhibit an undesirable assembly or seam line where the various pieces are joined. Assembly of the various pieces is very labor intensive, and there remains always the risk of failure of the joint. Second, the hollow core was molded about an insert which was later removed to produce the hollow. Where the shape of the core permits, a solid insert initially placed in the mold and later removed from the core will create a hollow in the core. However, some core shapes do not lend themselves to this technique as there is no way to remove a solid insert therefrom. In such instances, the insert may be formed of a material soluble in a solvent, so that the solvent may later be flushed through the core in order to remove therewith the insert material and leave a hollow. However, removal of the soluble insert tends to be slow and messy. Third, in slip casting the core is formed in a mold with plaster walls which extract the water or binder from the material adjacent to the walls and therefore leave on the walls a dried hollow casing. The need to extract the binder limits the materials which can be used and increases the time required for molding.

Thus the articles need remains for a method of forming a hollow ceramic article which does not result in assembly lines on the article (as in the first prior art option), does not require a fugitive element or insert added to and removed from the mold (as in the second prior art option), and does not require a binder absorbable by plaster or the time required for such absorption (as in the third prior art option).

Accordingly, it is an object of the present invention to provide a method for making hollow ceramic cores and other hollow ceramic articles.

Another object is to provide such a method which does not result in assembly lines on the article, does not require a fugitive element or insert added to and removed from the mold, and does not require a binder absorbable by plaster or the time required for such absorption.

A further object to provide such a method which is easy and economical.

SUMMARY OF THE INVENTION

It has now been found that the above and related objects are obtained in a method of forming a hollow ceramic article such as a core suitable for investment casting. The method comprises the steps of providing a mold having a wall defining a cavity and injecting into the cavity through an inlet through the cavity wall a quantity of a slurry sufficient to fill the cavity. The slurry is formed by a molten thermoplastic binder and ceramic particles suspended in the binder. The portion of the slurry in contact with the cavity wall is cooled to solidify the same, while leaving still molten the portion of the slurry not in contact with the cavity wall. Gas is next injected into the cavity through an inlet through the cavity wall and into the still molten slurry portion to force the same out of the cavity through an outlet through the cavity wall. This leaves within the cavity only the gas and a hollow green piece formed from the solidified slurry portion. The hollow green piece in then separated from the mold, and finally the separated hollow green piece is fired to remove substantially all of the binder therefrom and sinter together substantially only the ceramic particles therefrom.

In a preferred embodiment, the slurry is injected into the cavity under pressure and cooled by allowing it to remain in the cavity for approximately 15–30 seconds until a solid skin of thermoplastic material and ceramic particles has been formed adjacent the cavity wall. Preferably the separated green piece is filled with powder to assist in absorption of the binder and facilitate firing thereof.

The slurry may be injected into the cavity through the same inlet through the cavity wall as the gas and slurry is removed from the cavity.

BRIEF DESCRIPTION OF THE DRAWING

The above and related objects, features and advantages of the present invention will be more fully understood by reference to the following detailed description of the presently preferred, albeit illustrative, embodiments when taken in conjunction with the accompanying drawing wherein:

FIG. 1 is a side elevational view of a mold according to the present invention, with portion removed to reveal details of internal construction;

FIG. 2 is a sectional view thereof taken along the line 2—2 of FIG. 1, with the green piece in place.

DETAILED DESCRIPTION OF THE PREFERRED EMBODIMENTS

Figure 3:
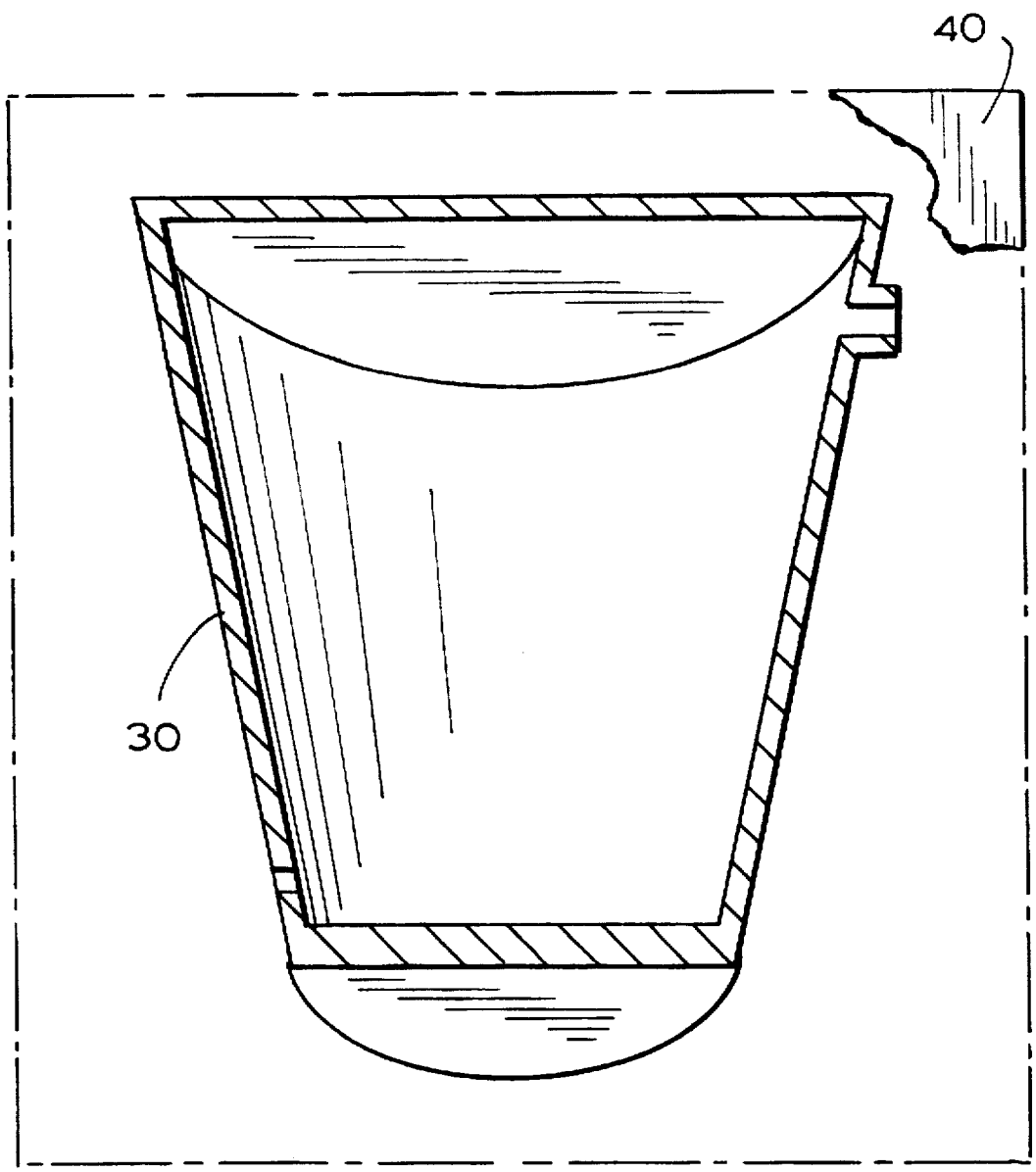
FIG. 3 is a sectional view of the green piece in a firing oven.

Referring now to FIG. 1, the method of the present invention may conveniently be performed using the apparatus illustrated in FIG. 1 including a mold or die, generally designated by the reference numeral 10.

The mold 10 includes a pair of separable sections 14 which together define an interior wall 18, in turn defining a cavity 20. The interior surface of the cavity wall 18 is, of course, designed to define and optionally pattern the outer wall of the desired ceramic core or other article. The mold 10 may be externally cooled by air, water or like refrigerant; alternatively, no particular external cooling system (other than ambient air) may be employed.

As will become apparent hereinafter, the cavity wall 18 additionally defines a valved inlet 22 for injecting slurry into cavity 20, a valved inlet 24 for injecting gas 20 into cavity 20, and a valved outlet 26 for removing gas and slurry from cavity 20. If desired, as illustrated, a single bi-valved conduit 22, 26 through the cavity wall 18 may suffice to serve for both the slurry inlet 22 and the gas/slurry outlet 26, the conduit being used first as the slurry inlet 22 and then the gas/slurry outlet 24, as will be described hereinafter. Aside from the arrange-ment of inlets and outlets, the mold 10 is essentially conventional in design.

The preparation of an injection molding mix or slurry accomplishes three distinct, albeit conventional, objectives: wetting of ceramic particles (e.g., fibers or whiskers) by the binder, deaggregation or deflocculation of the ceramic particles, and prevention of reaggregation of the ceramic particles.

For the ceramic particles to be dispersed into the binder phase involves wetting of the particle surfaces by the binder phase, whereby air is completely displaced from the particle surfaces by the binder phase. Virtually any wax can be used as the principal component of the binder phase: paraffin, microcrystalline, carnuba, polyethylene, etc. However, preferably either a mixture of paraffin wax and microcrystalline wax, or a mixture of paraffin wax, microcrystalline wax and montan wax composes the major portion of the binder phase. Paraffin wax is used not only for its very low viscosity in the molten state, but also because of its generally lower contact angle with (i.e., greater wettability of) ceramic surfaces. Montan wax is also often useful for its assistance in wetting ceramic fibers or whiskers. Microcrystalline wax imparts strength to the molded parts. Additionally, wetting agents (e.g., fatty acids such steric acid or oleic acid) may be added to the binder phase to aid in the wetting of the ceramic particle surfaces.

Even though the ceramic particles have been wet by the binder phase, they may still be aggregated into clumps or flocs, which must be broken up for the ceramic particles to be completely dispersed into the binder phase. Complete dispersion is necessary if the final injection molded article is to have a completely homogeneous microstructure, and essential if it is desired to obtain the maximum concentration of ceramic particles in the injection mix. Therefore, it is desirable to use a mixer that produces a high degree of shearing action during the mixing or compounding of the injection mixes—for example, a double planetary mixer having provisions for both heating and evacuating the mixing chamber or a so-called "high intensity" mixer having a fixed cylinder and a rotating cylinder in coaxial alignment defining a very small annular space between the two cylinders.

Once the ceramic particles have been dispersed into the binder phase, it is necessary to prevent the individual dispersed ceramic particles from coming together once again to form aggregates. This requires the formation of repulsive interparticle forces. In non-polar organic media, such as waxes, electrostatic barriers to aggregation are usually ineffective and steric barriers are generally required to disperse solid particles. Such barriers are developed using dispersing agents or surfactants, which are absorbed at the particle/ media interface. Stability arises because the absorbed molecules extend into the organic media and inhibit the close approach of two particles to each other. Preferred dispersing agent have a chemically functional group which is absorbed at the interface between the ceramic particles and the binder, and an organophilic soluble polymeric chain that extends into the binder phase. The absorbed functional group couples or bonds to the particle surfaces via hydrogen bonding or weak chemical bonding. The steric barriers then arise either from the energy required, as the ceramic particles approach one another, to desolvate the organophilic soluble polymeric chain extending into the binder phase; or from the decrease in the entropy of the system as these polymeric chains are restricted in their movement or arrangement by the close approach of two ceramic particles. Such "coupling type" dispersing agents include Menhaden oil (a fish oil), alkylbenzenes, etc.

It is also sometimes advantageous to add various other functional compounds to the injection mixes—e.g., plasticizers (such as lecithin), mold release aids, etc.

When preparing the injection mixes, there is nothing critical regarding the order of addition of ingredients. For example, the ingredients of the binder phase, waxes, wetting agents, dispersing agents, etc., can all be placed in the mixer and melted together. The ceramic particles can then be added, and mixed until a stable dispersion is obtained. Conversely, the waxes can be melted in the mixer, the ceramic particles added, and the other ingredients (i.e., wetting agents, dispersing agents, etc.) added while mixing is taking place.

After a stable dispersion has been produced, the injection mix can be removed from the mixer while still fluid, solidified in some suitable pan or container, and stored until being placed into an injection machine for molding. If desired, the heat to the mixer bowl can be shut off while the mixing action is continued, and a granulated or pelletized product will be obtained, which can be stored until being placed into an injection machine for molding.

Referring now to FIG. 2 in particular, utilizing conventional injection molding apparatus, a quantity of a slurry or injection molding mix sufficient to fill the cavity 20 is injected into the cavity 20 from an injection machine through the slurry inlet 22 of the cavity wall 18. A preferred slurry has from 60 to 90 parts by volume of ceramic particles suspended in 40 to 10 parts of a thermoplastic organic binder. By way of example, a preferred slurry is by weight 12% organic and 88% solids. The solids by weight are 70% fused silica and 30% zircon (zirconium silicate). The molten slurry is preferably forced by a conventional injecting machine into the mold or die at a pressure of about 300 p.s.i. and temperature of about 135° F. This is a conventional step in injection molding. Accordingly, further details of the injection step and the slurry used therein are not deemed necessary herein.

Still referring to FIG. 2 in particular, regard-less of whether the mold is naturally cooled by ambient air or positively cooled by air, water or refrigerant, the portion of the slurry injected into the cavity 20 which comes into contact with the cavity wall 18 will preferentially cool and solidify, leaving still molten the portion of the slurry which is not in contact with the cavity wall 18. Depending upon the heat transfer characteristics of the mold, the time allowed for cooling, the size of the cavity, and the relative percentage of the slurry to be solidified (i.e., the relative per-centage of the slurry in the cavity which is to form the green piece), a solid skin 30 of the thermoplastic binder and the ceramic particles suspended therein—called "the green piece"—can be formed in 15–30 seconds. Lesser or greater amounts of time may be required for cooling.

Once the cooling step has been completed and the green piece 30 formed, pressurized gas is injected into the cavity 20 through the gas inlet 24 in the cavity wall 18 and, more particularly, into the still molten slurry portion within the green piece 30. The gas forces the still molten slurry portion out of the cavity 20 through the gas/slurry outlet 26 in the cavity wall 18, thereby leaving within the cavity 20 only a portion of the gas and the green piece 30 formed from the solidified slurry portion or skin. For economic reasons, air is typically used as the gas, although an inert gas such as nitrogen may be preferred for a particular application. The gas is preferably injected at a pressure of 60 p.s.i., and room temperature for a period of 10 seconds, although the injection pressure, temperature and time will vary for particular applications and to obtain particular results. The gas is preferably selected for non-reactivity and immiscibility with the elements of the slurry so that the gas drives the still molten slurry portion ahead of it and does not appreciably react or mix either with the still molten slurry portion or the solidified skin 30. Naturally, care must be taken to ensure that the gas is injected into the still molten slurry portion and not intermediate the skin 30 and the cavity wall 18. The temperature of the gas is preferably selected so as to either minimize its cooling effect on the still molten portion of the slurry or maximize its cooling effect on the still molten portion to reduce cycle times. For economic reasons, the still molten slurry portion exiting the slurry outlet 26 may be recycled and reused.

Once the still molten slurry portion has exited cavity 20 through the gas/slurry outlet 26 and the green piece 30 cooled, the various sections 14 of the mold 10 are separated and the hollow green piece 30 removed therefrom. As the removal of the green piece 30 from the mold 10 is conventional in the art, further details need not be provided herein.

Referring now in particular to FIG. 3, the separated hollow green piece 30 is then moved into an oven 40 and fired at conventional temperatures and pressures to remove substantially all of the binder therefrom and to sinter together substantially only the ceramic particles therefrom. If desired, the separated green piece 30 may be filled with powder to assist in absorption of the binder therefrom and to facilitate firing thereof by adding further physical support to the green piece. As firing of a green piece is a conventional step in the ceramic art, further details need not be provided herein. However, it will be appreciated that the temperature and like parameters of the firing process must be adjusted for the hollow nature of the ceramic article being fired.

If desired, the slurry inlet 22 and the slurry outlet 26 may be the same conduit through the cavity wall 18, as illustrated, with appropriate valving to enable first the slurry alone to be introduced into the cavity 20 therethrough and then to enable the still molten slurry portion and gas to exit the cavity 20 therethrough. Of course, even in this instance the gas inlet 24 is separate from the slurry inlet/outlet 22, 26. Typically the gas inlet 24 will be disposed diametrically opposite the unitary inlet/outlet 22, 26 and at another vertical level of the mold 10 (such that if the slurry inlet/outlet 22, 26 is at the top of the mold, then the gas inlet 24 is at the bottom of the mold).

Typical of the products formed by the method of the present invention are the hollow core for a golf club driver, a core of this type typically having dimensions of 2–4 inches and being generally cubic. Another suitable product is the core for an automobile exhaust manifold, these parts being at least ½ inch in diameter and usually at least an inch in diameter. Furthermore, as the parts are curved, it is not possible to construct metal inserts in the mold that can be withdrawn to form an inside cavity. On the other hand, by the method of the present invention, a lightweight, hollow ceramic core can be very easily and economically produced.

It will be appreciated that the method of the present invention is very rapid relative to slip casting as it relies upon a freezing phenomenon rather than a binder removal phenomenon.

The following examples illustrate the efficacy of the present invention.

EXAMPLES

Example 1

A truncated conical part with a large diameter of 3 inches, a small diameter of 2.5 inches and a height of 3.5 inches was produced in a highly fused silica ceramic mold. The mold had a first inlet/outlet for injection and removal of a slurry and a second inlet for the injection of compressed air as illustrated in FIG. 1. A slurry formed of 70% fused silica and 30% zircon by weight was injected through the first inlet/outlet at 300 p.s.i. at a temperature of 135° F. The mold filled within a few seconds, at which point the first inlet/outlet was closed and the slurry allowed to commence solidification. Within ten seconds of the start of the injection cycle, room temperature air at 60–90 p.s.i. was introduced into the mold cavity through the second inlet and the first inlet/outlet was opened to permit the molten slurry in the center of the mold cavity to be "blown out" of the mold by the air stream. The part was then held in the mold for times ranging from 100–300 seconds to completely harden it.

The parts produced had a wall thickness of about 0.25 inch so that the total weight of the part was less than 50% of an equivalent solid piece. After this relative short injection cycle, there is no evidence of sink marks or cavitation in the part.

Example 2

A very large irregularly shaped airfoil part was produced according to the procedure of Example 1. The part was 12 inches long and had a maximum chord width of 6.5 inches. The maximum thickness varied from section to section from 1.75 to 4.0 inches, with the minimum thickness at the trailing edge being ⅛ inch. Various injection parameters were investigated according to the following table:

| Mix Temp (°F.) | Dwell (Sec.) | Part Weight |
| --- | --- | --- |
| 135 | 120 | 5 lb. 1 oz. |
| 180 | 360 | 5 lb. 2 oz. |

The weight of an equivalent solid airfoil part would be 6 pounds, 13 ounces. After injection, the part did not show evidence of cavitation (i.e., sink marks) or of a typical type of distortion that results from differential cooling of thick and thin portions.

To summarize, the present invention provides a method for making hollow ceramic cores and other hollow ceramic articles which does not result in assembly lines on the article, does not require a fugitive element or insert added to and removed from the mold, and does not require a binder absorbable by plaster or the time required for such absorption. The method is easy and economical.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A method of forming a fired hollow ceramic article, comprising the steps of:

(A) providing a mold having a wall defining a cavity;

(B) injecting into the cavity through an inlet through the cavity wall a quantity of a slurry sufficient to fill the cavity, the slurry being formed by a molten thermoplastic binder and ceramic particles suspended in the binder, the ratio of ceramic particles to slurry being sufficiently high to ensure sintering of the ceramic particles during subsequent firing;

(C) cooling the portion of the slurry in contact with the cavity wall to solidify the same while leaving still molten the portion of the slurry not in contact with the cavity wall;

(D) injecting a gas into the cavity through an inlet through the cavity wall and into the still molten slurry portion to force the same out of the cavity through an outlet through the cavity wall and leave therein only the gas and a hollow green piece formed from the solidified slurry portion;

(E) separating the hollow green piece from the mold; and (F) firing the separated hollow green piece to remove substantially all of the binder therefrom and sinter together substantially only the ceramic particles therefrom.

2. The method of claim 1 wherein the slurry is injected into the cavity under pressure.

3. The method of claim 1 wherein the slurry is cooled by allowing it to remain in the cavity for approximately 15–30 seconds until a solid skin of thermoplastic material and ceramic particles has been formed adjacent the cavity wall.

4. The method of claim 1 wherein the separated green piece is filled with powder to assist in absorption of the binder and facilitate firing thereof.

5. The method of claim 1 wherein the slurry is injected into the cavity through the same inlet through the cavity wall as the gas and slurry is removed from the cavity.

6. A method of forming a fired hollow ceramic core, comprising the steps of:

(A) providing a mold having a wall defining a cavity;

(B) injecting under pressure into the cavity through an inlet through the cavity wall a quantity of a slurry sufficient to fill the cavity, the slurry being formed by a molten thermoplastic binder and ceramic particles suspended in the binder, the ratio of ceramic particles to slurry being sufficiently high to ensure sintering of the ceramic particles during subsequent firing;

(C) cooling the portion of the slurry in contact with the cavity wall until a solid skin of thermoplastic material and ceramic particles has been formed adjacent the cavity wall, while leaving still molten the portion of the slurry not in contact with the cavity wall;

(D) injecting a gas into the cavity through an inlet through the cavity wall and into the still molten slurry portion to force the same out of the cavity through an outlet through the cavity wall and leave therein only the gas and a hollow green piece formed from the solidified slurry portion;

(E) separating the hollow green piece from the mold; and (F) firing the separated hollow green piece to remove substantially all of the binder therefrom and sinter together substantially only the ceramic particles therefrom.

7. The method of claim 6 wherein the slurry is injected into the cavity through the same inlet through the cavity wall as the gas/slurry is later removed from the cavity.

8. The method of claim 1 wherein the ceramic particles are at least 60% by volume of the slurry.

9. The method of claim 1 wherein the ceramic particles are 60–90% by volume of the slurry.

10. The method of claim 1 wherein the ceramic particles are at least 88% by weight of the slurry.

* * * * *